US012580471B2

(12) United States Patent
Kumath et al.

(10) Patent No.: US 12,580,471 B2
(45) Date of Patent: Mar. 17, 2026

(54) VOLTAGE CONVERTER WITH ADJUSTABLE FEEDBACK DIVIDER AND ADJUSTABLE TARGET VOLTAGE

(71) Applicant: Renesas Electronics America Inc., Milpitas, CA (US)

(72) Inventors: Lokesh Kumath, Cary, NC (US); Matthew Ambrose Cole, Los Altos, CA (US); Eric Magne Solie, Durham, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 262 days.

(21) Appl. No.: 18/313,757

(22) Filed: May 8, 2023

(65) Prior Publication Data

US 2024/0250598 A1 Jul. 25, 2024

Related U.S. Application Data

(60) Provisional application No. 63/480,629, filed on Jan. 19, 2023.

(51) Int. Cl.
*H02M 3/157* (2006.01)
*H02M 1/00* (2006.01)
*H02M 3/158* (2006.01)

(52) U.S. Cl.
CPC ......... *H02M 1/0025* (2021.05); *H02M 3/157* (2013.01); *H02M 3/158* (2013.01)

(58) Field of Classification Search
CPC ................................................. H02M 1/0025
See application file for complete search history.

(56) References Cited

U.S. PATENT DOCUMENTS

| | | | | |
|---|---|---|---|---|
| 3,997,892 A * | 12/1976 | Susset | ..................... | H03M 1/16 |
| | | | | 341/145 |
| 6,329,727 B1 * | 12/2001 | Traveis | ................. | H02M 3/157 |
| | | | | 307/115 |
| 2014/0043006 A1 * | 2/2014 | Tan | ........................ | H03K 5/135 |
| | | | | 323/298 |
| 2015/0168540 A1 * | 6/2015 | Morita | ................ | G01S 13/0209 |
| | | | | 342/21 |

* cited by examiner

*Primary Examiner* — Peter M Novak
(74) *Attorney, Agent, or Firm* — SCULLY, SCOTT, MURPHY & PRESSER, P.C.

(57) ABSTRACT

Systems and methods for operating a voltage converter are described. A circuit can multiply a digital code by a predetermined multiplier to obtain a product. The digital code can represent a desired output voltage of the voltage converter. The predetermined multiplier can cause the product to be maintained within a predetermined window. The product can be maintained within the predetermined window to cause an output of a reference digital-to-analog converter of the voltage converter to be maintained within a predetermined voltage window. The circuit can receive a feedback voltage indicating an output voltage of the voltage converter. The circuit can divide the feedback voltage by a divisor to obtain a divided voltage. The divisor can correspond to the digital code. The circuit can send the divided voltage to an error amplifier of the voltage converter.

14 Claims, 7 Drawing Sheets

500

LUT 308

| MIN VOUT REG Code | MAX VOUT REG Code | Digital Multiplier | Analog Divider | Tap M | REF DAC Output | | VOUT Output | |
|---|---|---|---|---|---|---|---|---|
| | | | | | MIN (V) | MAX (V) | MIN (V) | MAX (V) |
| 0 | 511 | 4 | 3 | M4 | 0 | 2.044 | 0 | 6.132 |
| 512 | 1023 | 2 | 6 | M3 | 1.024 | 2.046 | 6.144 | 12.276 |
| 1024 | 2047 | 1 | 12 | M2 | 1.024 | 2.047 | 12.288 | 24.564 |
| 2048 | 4095 | 0.5 | 24 | M1 | 1.024 | 2.0475 | 24.576 | 49.14 |

702 Multiply a digital code by a predetermined multiplier to obtain a product

704 Receive a feedback voltage indicating an output voltage of the voltage converter 706 Divide the feedback voltage by a divisor to obtain a divided voltage, wherein the divisor corresponds to the digital code;

708 Send the divided voltage to an error amplifier of the voltage converter.

VOLTAGE CONVERTER WITH ADJUSTABLE FEEDBACK DIVIDER AND ADJUSTABLE TARGET VOLTAGE

CROSS-REFERENCE TO RELATED APPLICATION

The present application claims the benefit of U.S. Patent Application No. 63/480,629, titled "ADAPTIVE FEEDBACK FOR WIDE OUTPUT VOLTAGE RANGE CONVERTERS" and filed on Jan. 19, 2023, which is hereby incorporated by reference in its entirety.

BACKGROUND

The present disclosure relates in general to semiconductor devices. More specifically, the present disclosure relates to an adaptive feedback for wide output voltage range converters.

Voltage converters can be used for converting an input voltage to an output voltage having a different voltage level. A buck converter, or step-down converter, can be used in applications where there is a need to decrease a direct current (DC) voltage. A boost converter, or step-up converter, can be used in applications where there is a need to increase a DC voltage. A voltage converter can include multiple switches connected to an inductor, such as transistors, at an input of the voltage converter, where the switches can be turned on and off by a pulse width modulated (PWM) control signal. A duty cycle of the PWM control signal can determine an output voltage of the voltage converter.

SUMMARY

In one embodiment, a semiconductor device is generally described. The semiconductor device can include a plurality of switches, a multiplier circuit, a tap selector, and a voltage divider. The multiplier circuit can be configured to multiply a digital code by a predetermined multiplier to obtain a product. The digital code can represent a desired output voltage of a voltage converter. The predetermined multiplier can cause the product to be maintained within a predetermined window. The multiplier circuit can be further configured to send the product to a reference digital-to-analog converter (DAC) of the voltage converter. The product can be maintained within the predetermined window to cause an output of the reference DAC to be maintained within a predetermined voltage window. The tap selector can be configured to activate a switch among the plurality of switches based on the digital code. The voltage divider can be configured to receive a feedback voltage indicating an output voltage of the voltage converter. The voltage divider can be further configured to divide the feedback voltage by a divisor to obtain a divided voltage. The divisor can correspond to the activated switch. The voltage divider can be further configured to send the divided voltage to an error amplifier of the voltage converter.

In one embodiment, a system is generally described. The system can include a reference digital-to-analog converter (DAC), an error amplifier, a pulse width modulator, and a circuit. The pulse width modulator can be configured to generate pulse width modulation (PWM) signals based on at least one of an output of the error amplifier and an inductor current of an inductor in a voltage converter. The circuit can be configured to multiply a digital code by a predetermined multiplier to obtain a product. The digital code can represent a desired output voltage of the voltage converter. The predetermined multiplier can cause the product to be maintained within a predetermined window. The circuit can be further configured to send the product to the reference DAC. The product can be maintained within the predetermined window causes an output of the reference DAC to be maintained within a predetermined voltage window. The circuit can be further configured to receive a feedback voltage indicating an output voltage of the voltage converter. The circuit can be further configured to divide the feedback voltage by a divisor to obtain a divided voltage. The divisor can correspond to the digital code. The circuit can be further configured to send the divided voltage to the error amplifier. The reference DAC can be configured to convert the product into a voltage signal. The reference DAC can be further configured to send the voltage signal to the error amplifier. The reference DAC can be further configured to the error amplifier being configured to output an error voltage between the voltage signal and the divided voltage to the pulse width modulator.

In one embodiment, a method for operating a voltage converter is generally described. The method can include multiplying a digital code by a predetermined multiplier to obtain a product. The digital code can represent a desired output voltage of a voltage converter. The predetermined multiplier can cause the product to be maintained within a predetermined window. The product can be maintained within the predetermined window to cause an output of a reference digital-to-analog converter (DAC) of the voltage converter to be maintained within a predetermined voltage window. The method can further include receiving a feedback voltage indicating an output voltage of the voltage converter. The method can further include dividing the feedback voltage by a divisor to obtain a divided voltage, wherein the divisor corresponds to the digital code. The method can further include sending the divided voltage to an error amplifier of the voltage converter.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 is an example diagram of a table relating to adaptive feedback for wide output voltage range converters in one embodiment.

DETAILED DESCRIPTION

DC-to-DC voltage conversion can be performed to convert an input DC voltage to an output DC voltage. DC-DC converters can be used in various battery powered applications ranging from notebooks, docking station, cell phones. The accuracy of the output voltage regulation in these DC-DC converters is desired to be as high as possible, such as ±1% or less.

Some voltage converters (e.g., multi-level voltage converters) can output a wide range of output voltages, such as from 5 volts (V) to 48V. Conventionally, the accuracy of the output voltage regulation tends to be higher at the higher end of such wide output voltage range, but tends to be lower at the lower end of the wide output voltage range. This difference in accuracy can cause inconsistency, and some conventional solutions may trim or scale the output voltage to accommodate the reduced accuracy. However, such trimming can require relatively large circuitry hence increasing die area and cost.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

The apparatuses, devices, systems, and/or methods described herein relates to using adaptive feedback for achieving high accuracy voltage regulation in systems with wide output voltage range. Applications of the apparatuses, devices, systems, and/or methods described herein can include, but not limited to, notebooks, docking stations, cell phones and many other systems where buck, boost, or buck/boost controllers/converters are used for power management. To be described in more detail below, relatively small circuitry can be added to a voltage converter system or chip to improve accuracy and consistency in output voltage regulation.

Figure 1:
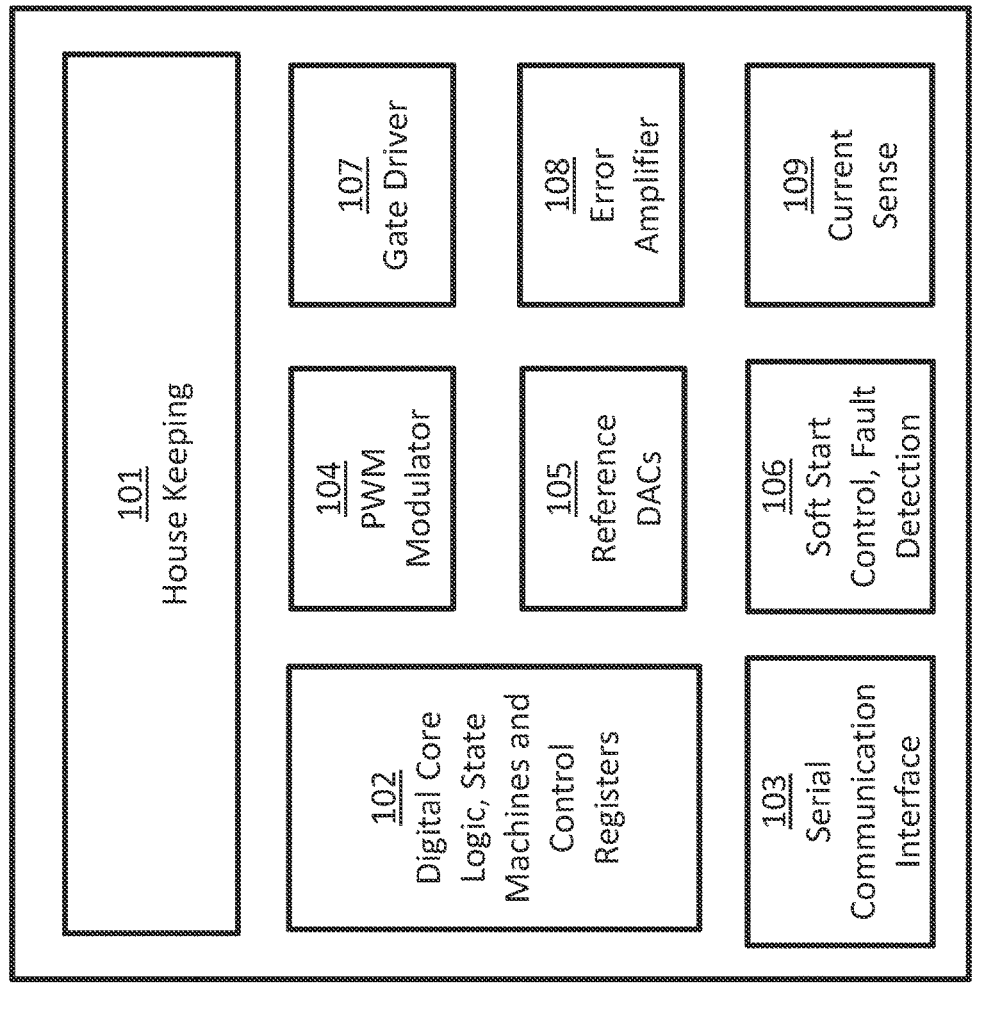
FIG. 1 is an example diagram of a system that can implement a voltage converter in one embodiment.

FIG. 1 is an example diagram of a system that can implement a voltage converter in one embodiment. System 100 shown in FIG. 1 can be a semiconductor device or chip implementing DC-DC converter integrated circuit (IC). System 100 can include a house keeping circuit 101 including components such as bandgap reference, low-dropout (LDO) regulators, biasing circuits, power-on reset comparator, and other components that may be necessary to operate system 100. System 100 can further include a circuit 102 that includes digital core logic, state machines and control registers. System 100 can further include a circuit 103 that includes serial communication interface such as I2C, Serial Peripheral Interface (SPI), or other communication interface that can be used by system 100. System 100 can further include pulse width modulators (e.g., PWM modulators) 104 that can generate pulse width modulation (PWM) signals based on at least one of an output voltage (see VOUT in FIG. 2 and FIG. 3) and an inductor current, or a sensed inductor current, of an inductor (see IL and inductor L in FIG. 2 and FIG. 3). System 100 can further include a gate driver 107 configured to drive transistors integrated in system 100, or transistors external to system 100, according to PWM signals outputted from PWM modulators 104. System 100 can further include a reference DACs 105. System 100 can further include a circuit 106 that includes soft start control and fault detection circuits. System 100 can further include an error amplifier 108 and a current sense circuit 109. Current sense circuit 109 can be configured to measure the sensed inductor current IL and provide the sensed inductor current IL to pulse width modulators 104. Depending on the type of the DC-DC converter IC and the feature set it provides, additional functional blocks may be present in system 100. In an aspect, the gate driver can be connected to integrated transistors in system 100 and/or transistors external to system 100.

Circuit 102 can include a digital register of N-bits, where N can be a programmable code representing a desired output voltage to be outputted by system 100. Reference DACs 105 can be used for generating a reference voltage based on this programmed code. The output of the voltage regulator can be divided down to a reasonable value using a resistive divider from the output. The divided down output can be compared against the reference voltage generated by reference DACs 105 using error amplifier 108. An output from error amplifier 108 can control PWM modulator 104 to adjust a duty cycle of the PWM signals such that the output voltage can be regulated. In an aspect, smaller output from error amplifier 108 can reduce adjustments being made to the duty cycle of the PWM control signals being generated by PWM modulator. The reduced adjustments can increase an accuracy and efficiency of system 100.

A feedback loop in a high voltage (e.g., 48V) DC-DC converter typically uses low voltage analog circuits (e.g., supply of 3.3V to 5V) for achieving better matching, lower offset, and higher bandwidth. The common mode voltage (of error amplifier 108) can range from near ground to near supply. Reference DAC 105 typically has a maximum output that can be lower than the common mode range. For example, the reference DAC full scale could be limited to 2.304V. When the output is set to the maximum value, the resistive divider must be designed to provide a feedback voltage less than the full scale of reference DAC 105. For a maximum output voltage of 48V (e.g., max value of the output voltage range), in this example, the feedback resistive divider must have a 1:24 attenuation ratio to keep the feedback voltage within the full scale of reference DAC 105. Hence, the feedback voltage will be a maximum of 2V in this case. Assuming a ±10 mV random offset in the error amplifier and ignoring all other sources of errors the output regulation accuracy will be ±0.5% which may be acceptable.

However, if the output voltage is set to 3V (e.g., on the lower end of the output voltage range), the feedback voltage can be 125 mV and the output regulation error becomes ~8%, which is significantly high to be acceptable in various applications. Other sources of errors in the system can include error from the resistor divider mismatch, differential nonlinearity (DNL) and integral nonlinearity (INL) of reference DAC 105. Hence, conventional implementations may not be suitable for wide output voltage range systems. Other conventional implementations, such as implementations that use a feedback circuit relying on a divided input voltage, does not cure these deficiencies as well.

Figure 2:
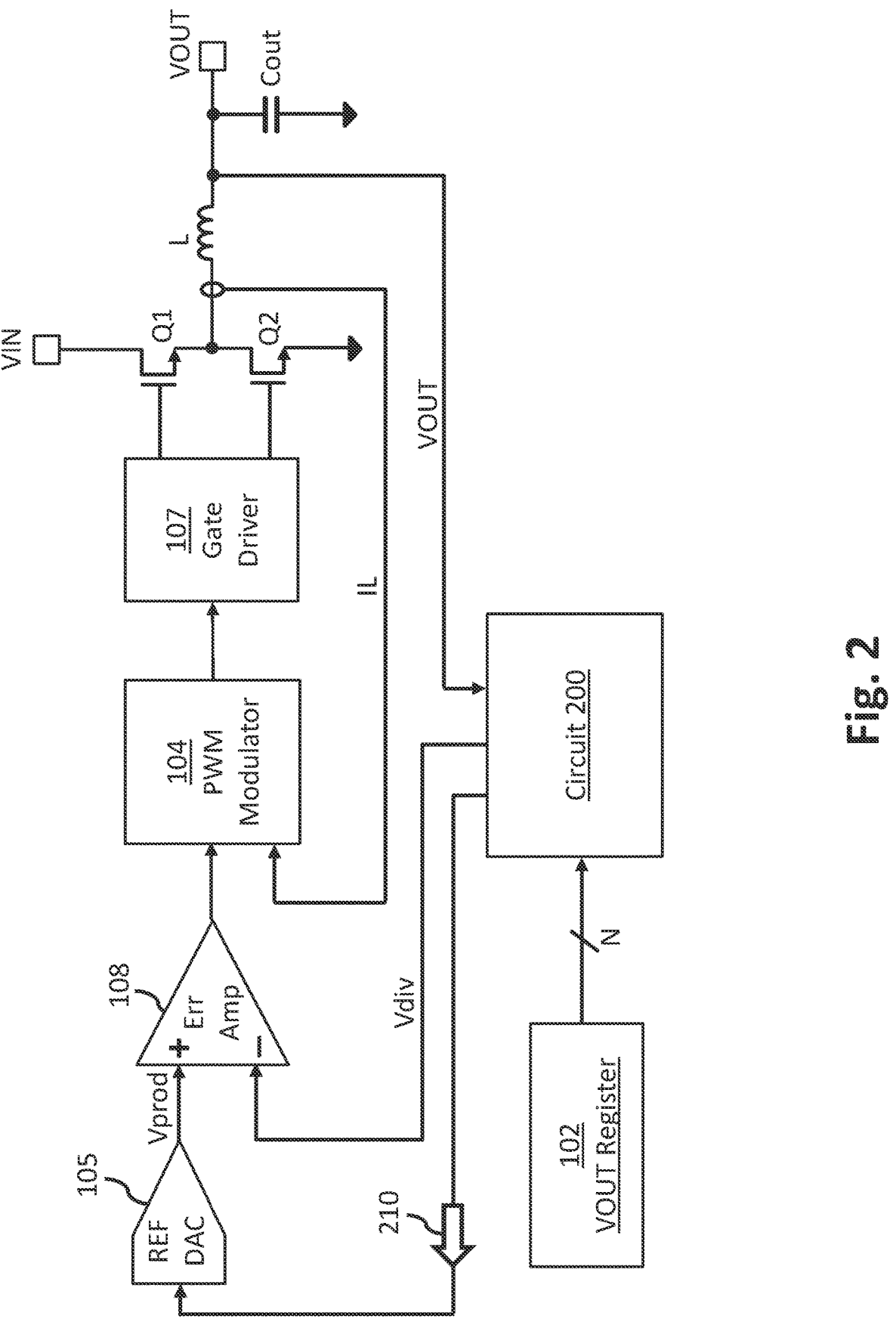
FIG. 2 is an example diagram of a circuit that can implement adaptive feedback for wide output voltage range converters in one embodiment.

FIG. 2 is an example diagram of a circuit that can implement adaptive feedback for wide output voltage range converters in one embodiment. A portion of system 100 of FIG. 1 is shown in FIG. 2. In an embodiment shown in FIG. 2, a circuit 200 can be integrated in system 100. Circuit 200 can be connected to an output of circuit 102, to an input of reference DAC 105, to an inverting input of error amplifier 108, and can receive a feedback voltage that is a measurement of output voltage VOUT. Circuit 200 can be integrated to perform adaptive feedback to achieve higher accuracy throughout an output voltage range.

Circuit 200 can be integrated in system 100 to 1) allow higher consistency and accuracy for the full output voltage range of system 100 when compared to conventional feedback methods where accuracy suffers at lower end of the output voltage range; 2) save cost and test time as it minimizes the requirements for trimming analog circuitry; 3) save cost and die area by avoiding additional circuitry such as trimming circuitry; and 4) add relatively small digital circuitry and minor changes to the existing analog circuits. Circuit 200 can use adaptive feedback to achieve higher accuracy in voltage regulation for the full output voltage range without increasing die area and production test time. Therefore, it saves cost and help develop smaller form factor volage converter ICs.

Circuit 200 can receive or retrieve a programmable code, or digital code of N-bits from a VOUT register in circuit 102. The digital code can represent a desired value of VOUT (e.g., a desired output voltage to be outputted by system 100 of FIG. 1). Circuit 200 can multiply the received digital code N by a predetermined multiplier to obtain a product 210 that can be a digital representation of a voltage labeled as Vprod. The predetermined multiplier can cause product 210 to be maintained within a predetermined window. Reference DAC 105 can be configured to convert product 210 into the voltage Vprod. Product 210 being maintained within the predetermined window can cause an output of reference DAC 105, or Vprod, to be maintained within a predetermined voltage window. Circuit 200 can measure output voltage VOUT and receive the measured VOUT as a feedback voltage. Circuit 200 can divide the feedback voltage, or VOUT, by a predetermined divisor to obtain a divided voltage Vdiv, where the divisor corresponds to the digital code. Circuit 200 can send the divided voltage Vdiv to error amplifier 108.

Figure 3:
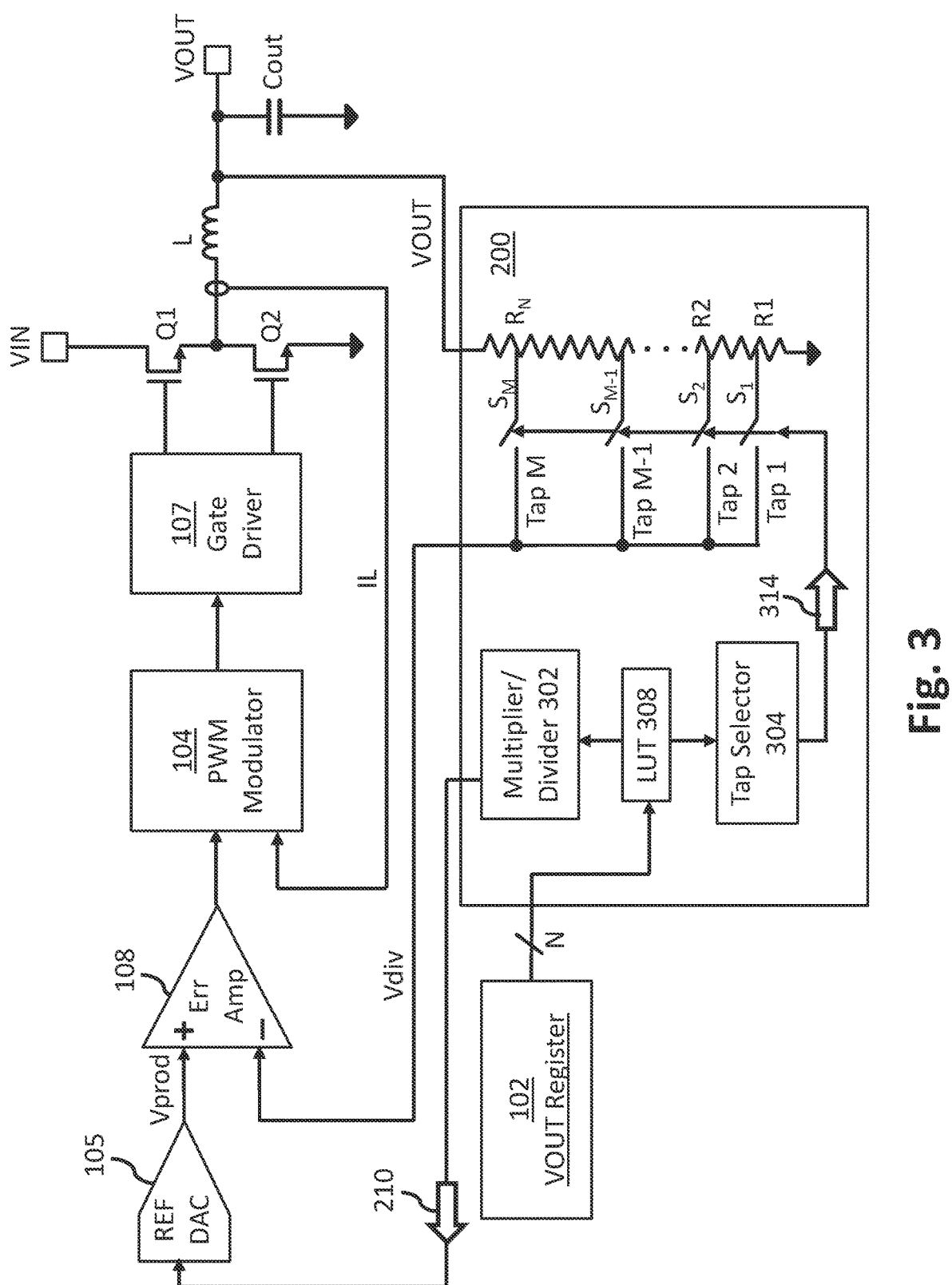
FIG. 3 is an example diagram showing details of the circuit shown in FIG. 2 in one embodiment.

FIG. 3 is an example diagram showing details of the circuit 200 shown in FIG. 2 in one embodiment. In one embodiment, circuit 200 can include a digital multiplier divider 302, a tap selector 304, a plurality of resistors connected in series, such as resistors R1, R2 . . . , $R_N$ and a plurality of switches $S_1$, $S_2$ . . . , $S_M$. Digital multiplier divider 302 can pre-process the programmed or digital code N outputted by circuit 102, such as multiplying N by a predetermined multiplier to generate product 210. The predetermined multiplier can be stored in circuit 200. In one embodiment, the predetermined multiplier can be stored in a lookup table (LUT) 308 in circuit 200. In one embodiment, the plurality of switches $S_1$, $S_2$ . . . , $S_M$ can be spaced apart from one another by an arbitrary distance (e.g., can be same or different distances), and the number of switches M can be arbitrary and dependent on a desired implementation of circuit 200 and/or system 100.

Tap selector 304 can receive programmed or digital code N from circuit 102, and can generate a control signal 314 indicating M taps based on programmed code N. In one embodiment, a plurality of values for N can be mapped to a plurality of values of M in LUT 308. Thus, tap selector 304 can refer to LUT 308 to determine M based on N. The M taps in control signal 314 can cause a selection of one switch among the plurality of switches in circuit 200. By way of example, if tap selector 304 outputs control signal 314 indicating M=2, then switch $S_2$ will be selected to be activated (e.g., closed). If tap selector 304 outputs control signal 314 indicating M=M−1, then switch $S_{M-1}$ will be selected to be activated. In one embodiment, one tap or switch among the plurality of switches $S_1$, $S_2$, . . . , $S_M$ can be selected at a time.

Different sets or combinations of resistors among the plurality of resistors in circuit 200, such as resistors R1, R2 . . . , $R_N$ can form different voltage dividers that can divide VOUT by a divisor corresponding to a switch being tapped or selected by M. In one embodiment, LUT 308 can include mappings between the values of M and a plurality of predetermined divisors. If tap selector 304 outputs control signal 314 indicating M=2 and M=2 is mapped to a divisor of "3" in LUT 308, then switch $S_2$ will be activated. In response to switch $S_2$ being activated, an output of the voltage divider formed by R1, R2 . . . , $R_N$ can be connected to an inverting input of error amplifier 108. The voltage divider formed by R1, R2 . . . , $R_N$ can divide VOUT by "3" according to LUT 308, and a voltage of VOUT/3 can be provided to error amplifier 108 through the activated switch $S_2$.

The implementations of digital multiplier divider 302, tap selector 304, the voltage divider formed by the plurality of resistors (e.g., R1, R2 etc.), and the plurality of switches in circuit 200, can maintain Vprod being outputted by reference DAC 105 within a predetermined voltage window (e.g., a window of approximately 1V to 2V). By maintaining Vprod within predetermined window, the range of reference voltages being inputted to the non-inverting input of error amplifier 108 is relatively smaller. Further, a feedback voltage (e.g., measured VOUT) can be scaled or divided to voltage that can be comparable to Vprod. Both Vprod and feedback voltage can be maintained within predetermined window leading to higher accuracy and consistency for the full range of the output voltage of system 100.

Figure 4:
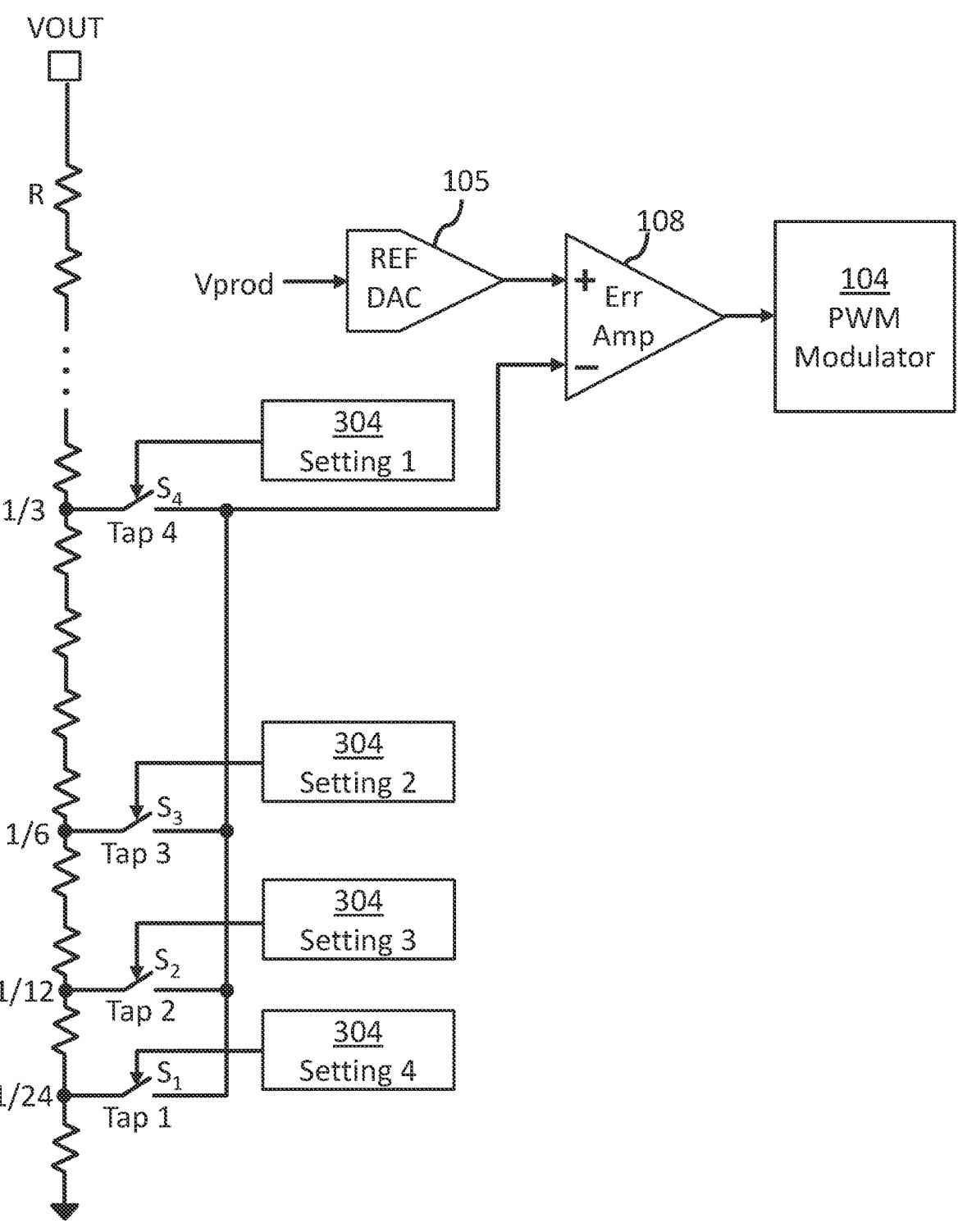
FIG. 4 is a diagram showing an example implementation of tap selection in adaptive feedback for wide output voltage range converters in one embodiment.

FIG. 4 is a diagram showing an example implementation of tap selection in adaptive feedback for wide output voltage range converters in one embodiment. In an example shown in FIG. 4, the number of taps or switches in circuit 200 of FIG. 2 and FIG. 3 is set to four (e.g., M=4). Also in the example shown in FIG. 4, different sets or combination of resistors among a plurality of resistors can form different voltage dividers that receives VOUT (at a VOUT pin) as input and output different divided values of VOUT. Based on the tap or switch selected, a divided VOUT corresponding to the selected switch or tap can be outputted to error amplifier 108. The number of resistors forming the voltage divider can be dependent on the number of taps or the value of M. The spacing of the M=4 taps, the number of resistors between each pair of taps, and the resistance of the resistors, can be designed or set such that the feedback ratio is 1:24, 1:12, 1:6 or 1:3 from the VOUT pin to the input of error amplifier 108.

In one embodiment, the plurality of resistors can include forty-eight resistors R having identical resistance, such as one-hundred kilo-ohms. In another embodiment, the resistance of resistors among the plurality of resistors may not be identical. In the example shown in FIG. 4, under Setting 1 that indicates N is within a range of values 0-511, tap selector 304 can reference LUT 308 and based on a mapping between the range 0-511 and M=4, select the tap M=4. In response to tap M=4 being selected, control signal 314 in FIG. 3 can activate switch $S_4$. In response to switch $S_4$ being activated, a plurality of resistors between switch $S_4$ and VOUT can form a voltage divider that divides VOUT by 3.

In another example shown in FIG. 4, under Setting 2 that indicates N is within a range of values 512-1023, tap selector 304 can reference LUT 308 and based on a mapping between the range 512-1023 and M=3, select the tap M=3. In response to tap M=3 being selected, control signal 314 in FIG. 3 can activate switch $S_3$. In response to switch $S_3$ being activated, a plurality of resistors between switch $S_3$ and VOUT can form another voltage divider that divides VOUT by 6.

In another example shown in FIG. 4, under Setting 3 that indicates N is within a range of values 1024-2047, tap selector 304 can reference LUT 308 and based on a mapping between the range 1024-2047 and M=2, select the tap M=2. In response to tap M=2 being selected, control signal 314 in FIG. 3 can activate switch S₂. In response to switch S₂ being activated, a plurality of resistors between switch S₂ and VOUT can form another voltage divider that divides VOUT by 12.

In another example shown in FIG. 4, under Setting 3 that indicates N is within a range of values 2048-4095, tap selector 304 can reference LUT 308 and based on a mapping between the range 2048-4095 and M=1, select the tap M=1. In response to tap M=1 being selected, control signal 314 in FIG. 3 can activate switch S₁. In response to switch S₁ being activated, a plurality of resistors between switch S₁ and VOUT can form another voltage divider that divides VOUT by 24.

FIG. 5 is an example diagram of a table 500 relating to adaptive feedback for wide output voltage range converters in one embodiment. Table 500 in FIG. 5 can include LUT 308 shown in FIG. 3. In LUT 500, values in a column labeled as "MIN VOUT REG CODE" defines a lower bound of the digital code N and a column labeled as "MAX VOUT REG CODE" defines an upper bound of the digital code N. The column labeled as "Digital Multiplier" can include values of predetermined multipliers that can be used by digital multiplier divider 302 (see FIG. 3) to multiply and/or divide N. The column labeled as "Analog Divider" can include values of predetermined divisors that can be used by tap selector 304 to determine which tap or switch to activate in circuit 200 shown in FIG. 2 to FIG. 4. The column labeled as "Tap M" can include values of tap M that can be used by tap selector 304 to select a switch for forming a voltage divider that divide VOUT by a corresponding "Analog Divider" value in LUT 308. multiply and/or divide N. The columns under "REF DAC Output" and "VOUT output" may not be part of LUT 308 and are shown in table 500 for explanation purposes.

By way of example, if N=500, then N corresponds to a range bounded by a lower bound 0 and an upper bound 511, and values in the first row of LUT 500 can be mapped to N=500. For example, digital multiplier divider 302 can receive N=500, from circuit 102 (see FIG. 2, FIG. 3), and refer to LUT 308 to determine that N=500 is mapped to multiplier of "4". In response to the determination of the mapping, digital multiplier divider 302 can multiply "500" by "4" to obtain "2,000" (e.g., product 210 in FIG. 2 being 2,000) and reference DAC 105 can convert the digital value representing "2,000" into a voltage (e.g., Vprod) of approximately 2.0V. The voltage Vprod of 2.0V can be inputted to the non-inverting input of error amplifier 108.

Tap selector can also receive N=500, from circuit 102, and refer to LUT 308 to determine that N=500 is mapped to divisor of "3" and tap of M=4. In response to the determination of the mapping, tap selector 304 generate control signal 314 that indicates a tap of M=4 that can activate switch S₄ in FIG. 4 to divide VOUT by "3". In closed loop, both inputs of error amplifier can be equal. This regulates VOUT to 6V. Note that the results of the multiplication of N with the predetermined multiplier, and the division of VOUT with the predetermined divisor, can be approximately the same because of implementing circuit 200.

Figure 6:
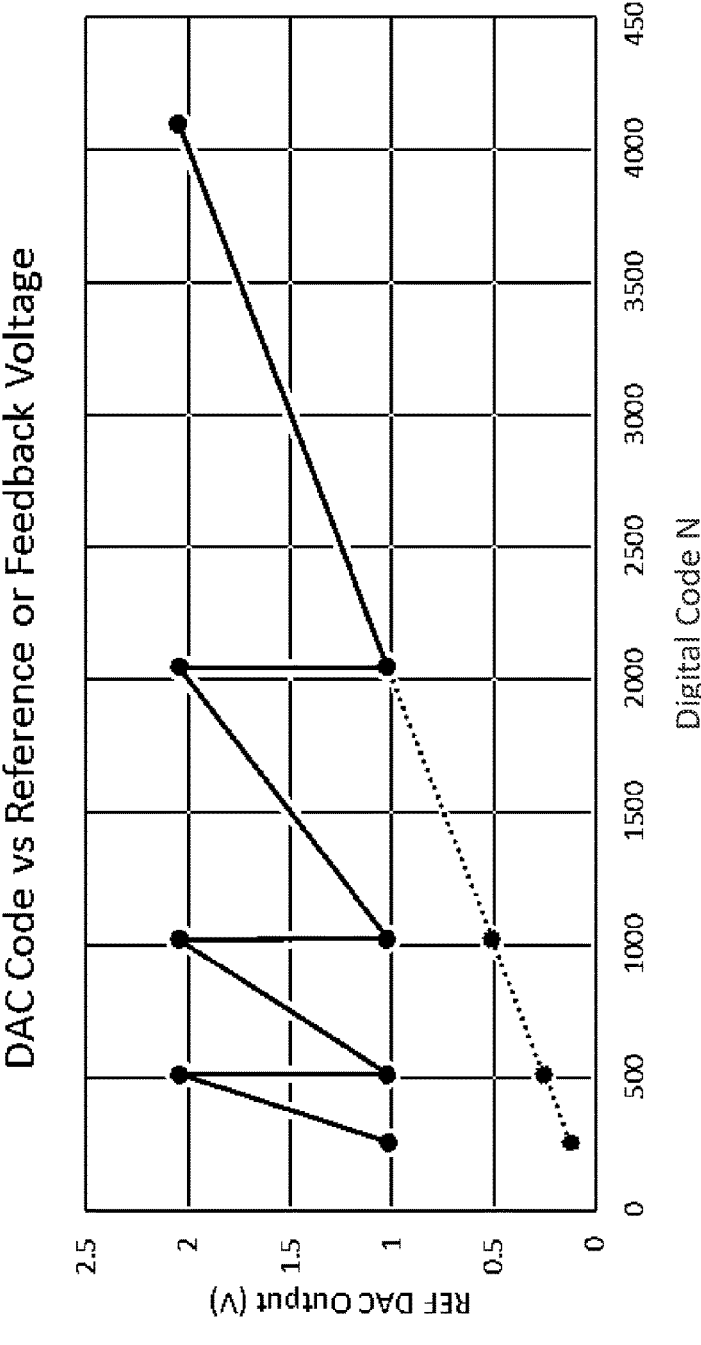
FIG. 6 is an example diagram showing waveforms of a reference digital-to-analog converter (DAC) voltages relating to implementations of adaptive feedback for wide output voltage range converters in one embodiment.

FIG. 6 is an example diagram showing waveforms of a reference digital-to-analog converter (DAC) voltages relating to implementations of adaptive feedback for wide output voltage range converters in one embodiment. In graph 600, reference DAC output from conventional implementations appears as shown in the dotted line and reference DAC output from the implementations described herein appears as the solid line. Focusing on the solid line, the reference DAC output, (e.g., Vprod in FIG. 2 and FIG. 3) can be maintained between 1V to 2V for the range of the DAC code, or digital code N, from 255 to 4096. This range of DAC code corresponds to an output voltage of ~3V to 49V as shown in table 500 of FIG. 5. The impact of the error amplifier offset (±10 mV) is <1% for the full output range when compared to the traditional approach where the DAC output (dotted line) goes as low as ~127 mV which can cause up to ~8% error in the output (assuming all other sources of errors can be ignored).

Figure 7:
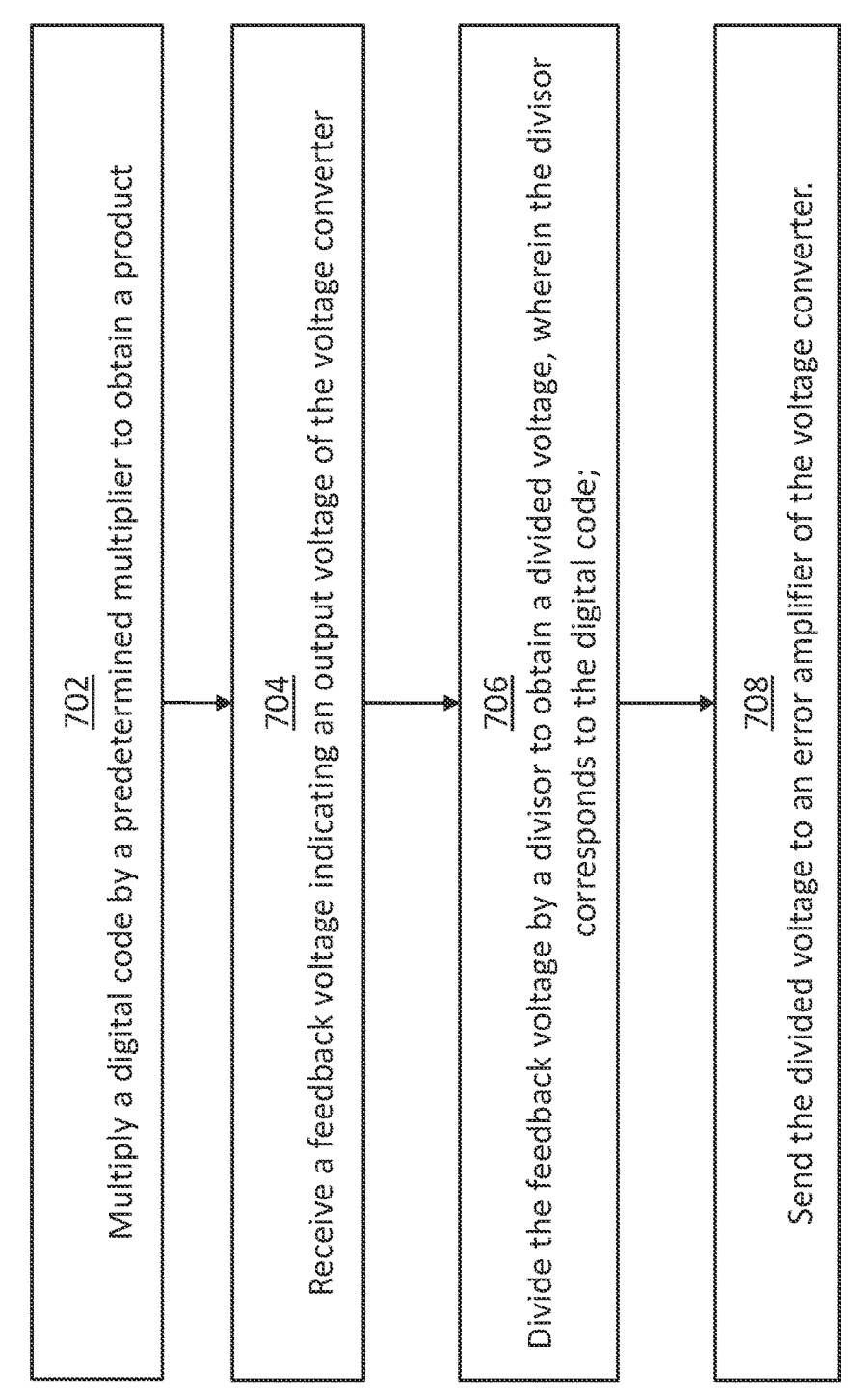
FIG. 7 illustrates a flow diagram relating to adaptive feedback for wide output voltage range converters in one embodiment.

FIG. 7 illustrates a flow diagram relating to adaptive feedback for wide output voltage range converters in one embodiment. The process 700 in FIG. 7 may be performed for operating voltage converter chips, such as system 100 shown in FIG. 1. The process 700 can include one or more operations, actions, or functions as illustrated by one or more of blocks 702, 704, 706, and/or 708. Although illustrated as discrete blocks, various blocks may be divided into additional blocks, combined into fewer blocks, eliminated, performed in different order, or performed in parallel, depending on the desired implementation.

Process 700 can begin at block 702. At block 702, a circuit of a voltage converter can multiply a digital code by a predetermined multiplier to obtain a product. The digital code can represent a desired output voltage of a voltage converter. The predetermined multiplier can cause the product to be maintained within a predetermined window. The product can be maintained within the predetermined window to cause an output of a reference digital-to-analog converter (DAC) of the voltage converter to be maintained within a predetermined voltage window. In one embodiment, the circuit can retrieve the digital code from a register of the voltage converter.

Process 700 can proceed from block 702 to block 704. At block 704, the circuit can receive a feedback voltage indicating an output voltage of the voltage converter. Process 700 can proceed from block 704 to block 706. At block 706, the circuit can divide the feedback voltage by a divisor to obtain a divided voltage. The divisor can correspond to the digital code. Process 700 can proceed from block 706 to block 708. At block 708, the circuit can send the divided voltage to an error amplifier of the voltage converter.

In one embodiment, the circuit can identify the divisor from a mapping between the divisor and the digital code stored in a lookup table. The lookup table can store the predetermined multiplier and the divisor, and mappings among different ranges of the digital code, different predetermined multipliers, and different divisors. The circuit can further identify, based on the divisor, a switch among a plurality of switches in the circuit. The circuit can further activate the switch among the plurality of switches to causes a set of resistors among a plurality of resistors to divide the feedback voltage. In one embodiment, one switch among the plurality of switches can be activated at a time. In one embodiment, the circuit can identify the predetermined multiplier from a mapping between the divisor and the digital code stored in a lookup table.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
a plurality of switches;
a register configured to provide a digital code to a multiplier circuit and a tap selector, wherein:
the multiplier circuit is configured to:
multiply the digital code by a predetermined multiplier to obtain a product, wherein the digital code represents a desired output voltage of a voltage converter, and the predetermined multiplier causes the product to be maintained within a predetermined window; and
send the product to a reference digital-to-analog converter (DAC) of the voltage converter, wherein the product being maintained within the predetermined window causes an output of the reference DAC to be maintained within a predetermined voltage window;
the tap selector is configured to activate a switch among the plurality of switches based on a digital signal corresponding to the same digital code from the register; and
a voltage divider comprising a plurality of resistors connected to the plurality of switches, and activation of different switches among the plurality of switches causes different sets of resistors among the plurality of resistors to divide a feedback voltage, wherein the voltage divider is configured to:
receive the feedback voltage indicating an output voltage of the voltage converter;
divide the feedback voltage by a divisor to obtain a divided voltage, wherein the divisor corresponds to the activated switch based on the digital signal; and
send the divided voltage to an error amplifier of the voltage converter.

2. The semiconductor device of claim 1, wherein one switch among the plurality of switches is activated at a time.

3. The semiconductor device of claim 1, further comprising a lookup table configured to store the predetermined multiplier and the divisor, wherein mappings among different ranges of the digital code, different predetermined multipliers, and different divisors, are stored in the lookup table.

4. The semiconductor device of claim 3, wherein the tap selector is configured to:
reference the lookup table to identify the divisor from a mapping between the divisor and the digital code; and
identify the switch among the plurality of switches based on the divisor.

5. The semiconductor device of claim 3, wherein the multiplier circuit is configured to reference the lookup table to identify the predetermined multiplier from a mapping between the predetermined multiplier and the digital code.

6. A system comprising:
a reference digital-to-analog converter (DAC);
an error amplifier;
a pulse width modulator, the pulse width modulator configured to generate pulse width modulation (PWM) signals based on at least one of an output of the error amplifier and an inductor current of an inductor in a voltage converter;
a register configured to store a digital code and provide the digital code to a circuit, wherein:
the circuit comprises:
a plurality of resistors connected to a plurality of switches;
a tap selector configured to:
receive a feedback voltage indicating an output voltage of the voltage converter;
activate a switch among the plurality of switches based on a digital signal corresponding to the digital code to cause different sets of resistors among the plurality of resistors to divide the feedback voltage;
divide the feedback voltage by a divisor to obtain a divided voltage, wherein the divisor corresponds to the activated switch based on the digital signal corresponding to the digital code; and
send the divided voltage to the error amplifier;
the circuit further being configured to:
multiply the same digital code, provided by the register, by a predetermined multiplier to obtain a product, wherein the digital code represents a desired output voltage of the voltage converter, and the predetermined multiplier causes the product to be maintained within a predetermined window;
send the product to the reference DAC, wherein the product being maintained within the predetermined window causes an output of the reference DAC to be maintained within a predetermined voltage window;

the reference DAC being configured to:

convert the product into a voltage signal;

send the voltage signal to the error amplifier; and the error amplifier being configured to output an error
    voltage between the voltage signal and the divided
    voltage to the pulse width modulator.

7. The system of claim 6, wherein one switch among the
plurality of switches is activated at a time.

8. The system of claim 6, wherein the circuit further
comprises a lookup table configured to store the predetermined multiplier and the divisor, and mappings among
different ranges of the digital code, different predetermined
multipliers, and different divisors, are stored in the lookup
table.

9. The system of claim 8, wherein the circuit is configured
to:

reference the lookup table to identify the divisor from a
    mapping between the divisor and the digital code;

identify the switch among a plurality of switches in the
    circuit; and activate the identified switch to divide the feedback
    voltage by the divisor.

10. The system of claim 8, wherein the circuit is configured to reference the lookup table to identify the predetermined multiplier from a mapping between the predetermined multiplier and the digital code.

11. A method for operating a voltage converter, the
method comprising:

retrieving a digital code from a register of the voltage
    converter;

multiplying the digital code by a predetermined multiplier
    to obtain a product, wherein the digital code represents
    a desired output voltage of a voltage converter, the
    predetermined multiplier causes the product to be
    maintained within a predetermined window, and the
    product being maintained within the predetermined window causes an output of a reference digital-to-
analog converter (DAC) of the voltage converter to be
maintained within a predetermined voltage window;

receiving a feedback voltage indicating an output voltage
of the voltage converter;

identifying, based on a digital signal corresponding to the
same digital code provided by the register, a switch
among a plurality of switches; and activating the switch among the plurality of switches to
cause a set of resistors among a plurality of resistors to
divide the feedback voltage;

dividing the feedback voltage by a divisor to obtain a
divided voltage, wherein the divisor corresponds to the
activated switch based on the digital signal corresponding to the digital code; and sending the divided voltage to an error amplifier of the
voltage converter.

12. The method of claim 11, wherein dividing the feedback voltage by the divisor comprises:

identifying the divisor from a mapping between the
    divisor and the digital code stored in a lookup table,
    wherein the lookup table stores the predetermined
    multiplier and the divisor, and mappings among different ranges of the digital code, different predetermined
    multipliers, and different divisors.

13. The method of claim 12, wherein one switch among
the plurality of switches is activated at a time.

14. The method of claim 11, further comprising identifying the predetermined multiplier from a mapping between
the divisor and the digital code stored in a lookup table,
wherein the lookup table stores the predetermined multiplier
and the divisor, and mappings among different ranges of the
digital code, different predetermined multipliers, and different divisors.

* * * * *